(12) United States Patent
Inadome

(10) Patent No.: US 8,730,262 B2
(45) Date of Patent: May 20, 2014

(54) ELECTRONIC APPARATUS AND DISPLAY METHOD IN ELECTRONIC APPARATUS

(75) Inventor: Masao Inadome, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1177 days.

(21) Appl. No.: 12/667,018

(22) PCT Filed: Jun. 27, 2008

(86) PCT No.: PCT/JP2008/061750
§ 371 (c)(1),
(2), (4) Date: Feb. 24, 2010

(87) PCT Pub. No.: WO2009/001933
PCT Pub. Date: Dec. 31, 2008

(65) Prior Publication Data
US 2010/0321403 A1 Dec. 23, 2010

(30) Foreign Application Priority Data
Jun. 28, 2007 (JP) ................................. 2007-170422

(51) Int. Cl.
*G09G 5/00* (2006.01)
*G01V 1/40* (2006.01)

(52) U.S. Cl.
USPC ................................. 345/629; 345/619; 702/6

(58) Field of Classification Search
USPC ........................................................ 345/629
See application file for complete search history.

(56) References Cited

U.S. PATENT DOCUMENTS

| 7,236,622 B2 * | 6/2007 | Chen et al. | 382/132 |
| 7,312,798 B2 * | 12/2007 | Yach et al. | 345/589 |
| 7,802,206 B1 * | 9/2010 | Davis et al. | 715/864 |

FOREIGN PATENT DOCUMENTS

| JP | 2001-245352 | 9/2001 |
| JP | 2003-008694 | 1/2003 |
| KR | 2001-0085733 | 9/2001 |

OTHER PUBLICATIONS

International Search Report for PCT/JP2008/061750, mailed Jul. 22, 2008.
Office Action from Korean Patent Application No. 10-2010-7002018, mailed on Apr. 12, 2011.

* cited by examiner

*Primary Examiner* — Ke Xiao
*Assistant Examiner* — Kwang Lee
(74) *Attorney, Agent, or Firm* — Duane Morris LLP

(57) ABSTRACT

In an electronic device and its display method, which dissolves a feeling of wrongness given to users in the case where information displayed in the foreground image and its related information is displayed in the background image, thereby making it possible to reduce a burden imposed on users; when a wallpaper display processing is carried out and a background image displayed by a background image display unit (183) is included in information and its related information displayed by an information display unit (182), such as a clock, a date, a radio condition, a remaining battery charge, and the like; an information display suppression unit (184) suppresses display of either the information display by the information display unit (182) or the information display by the background image display unit (183).

9 Claims, 5 Drawing Sheets

STANDBY SCREEN SETTING ILLUSTRATION
WITH CLOCK DISPLAY IN BACKGROUND IMAGE

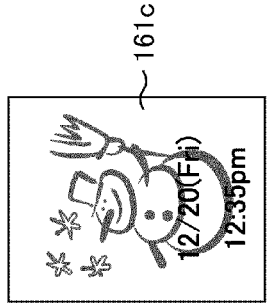
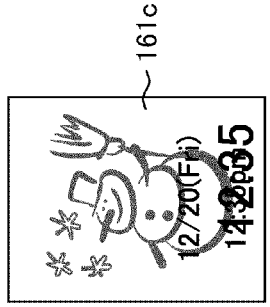
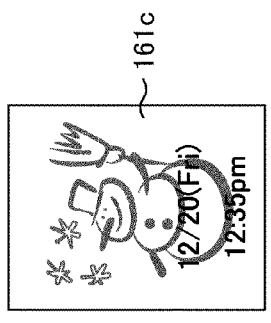
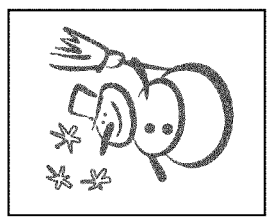
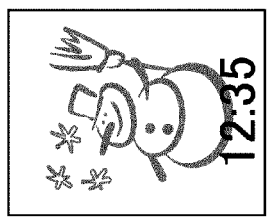
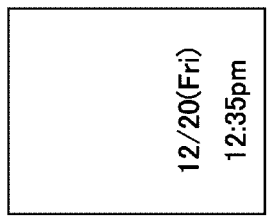
FIG. 5A  FIG. 5B  FIG. 5C  FIG. 5D

ELECTRONIC APPARATUS AND DISPLAY METHOD IN ELECTRONIC APPARATUS

CROSS-REFERENCE TO RELATED APPLICATIONS

This is a US National Phase Application of International Application No. PCT/JP2008/061750 filed Jun. 27, 2008, which claims priority to Japanese Patent Application No. 2007-170422 filed Jun. 28, 2007, the disclosures of which are incorporated herein by reference in their entirety.

TECHNICAL FIELD

The present invention relates to an electronic device capable of displaying an image containing various types of information and to a display method in an electronic device.

BACKGROUND ART

Mobile phones, one example of electronic devices, are becoming increasingly advanced in functions. Recently, it has become possible to set any image downloaded through the Web (World Wide Web) on a standby screen of a mobile phone.

Further, the image formats which can be handled by mobile phones have been increasing. Recently, there have been mobile phones capable of registering flash content as wallpaper.

Many methods for superimposing a clock and an illustration on a standby screen have been proposed.

For example, Patent Document 1 discloses a mobile phone reducing a difficulty of reading time and a lowering of beauty of a character image due to superimposition of the character image and the clock image.

Further, Patent Document 2 discloses a mobile phone selecting a foreground image and a background image from among a plurality of screens, superimposing these, and displaying the result as a composite screen image.

Patent Document 1: Japanese Patent Publication (A) No. 2003-8694

Patent Document 2: Japanese Patent Publication (A) No. 2001-245352

DISCLOSURE OF THE INVENTION

Problem to be Solved by the Invention

In this regard, among the above illustrations (for example, flash content), there are ones displaying time information assuming setting (display) on the standby screen.

On the other hand, among the functions provided as standard at a mobile phone, there is a function of displaying the time on the standby screen.

In a case where an illustration displaying a time is set in this state in wallpaper or another background image, if the time is displayed as a foreground image, for example, as shown in FIG. 1, both of the clock display of the foreground image and the clock display of the background image are displayed. The user is given a strange feeling.

Further, the two time displays are sometimes displayed superposed. In this case, there was a problem that the displayed time could not be read.

The present invention provides a portable electronic device capable of reducing the strange feeling given to users concerning the display in a display part and a display method in an electronic device.

Means for Solving the Problem

An electronic device of a first aspect of the present invention is provided with a display part and a control part controlling display content of the display part, wherein the control part includes an information acquisition part acquiring display information, an information display part displaying the display information acquired at the information acquisition part on the display part, and an information display suppression part suppressing display of either of the display information displayed by the information display part or related information contained in the display image displayed in the display region when related information related to the display information displayed by the information display part is contained in the image displayed in the display region of the display part.

Further, in the electronic device of the present invention, the control part may make it possible to superimpose a foreground image on the display image, and the information display suppression part may suppress display of either of the display information or the related information when the information display part displays the display information in the foreground image.

Further, in the electronic device of the present invention, the information display suppression part may find the display position of the related information in the display image and the display position of the display information in the foreground image and suppress display of either of the display information or the related information when the related information and the display information are to be displayed at the same position or at positions close to each other based on these display positions.

Further, in the electronic device of the present invention, the information display suppression part need not suppress display when the display information and the related information are displayed at positions different from each other on the display part.

Further, in the electronic device of the present invention, the display image is displayed in a first display region of the display part, and the information display suppression part need not suppress display when the display information is displayed in a second display region different from the first display region.

Further, in the electronic device of the present invention, when one of the display information and related information contains information which is not contained in the other of the display information and related information, the information display suppression part may suppress display of the other of the display information and the related information.

Further, in the electronic device of the present invention, when one of the display information or the related information contains predetermined information, the information display suppression part may suppress setting of display of the predetermined information when setting display of the other of the display information and the related information.

Further, in the electronic device of the present invention, the information display suppression part need not suppress display when the display format of the display information and the display format of the related information are different.

A display method in an electronic device of a second aspect of the present invention is a display method in an electronic device provided with a display part and a control part controlling display content of the display part, having a step of acquiring display information and displaying the display information on the display part, a step of displaying the display image in a display region of the display part, and a step of suppressing display of either of the display information or related information contained in the display image when the display image contains related information related to the display information.

Effect of the Invention

According to the present invention, by displaying of a plurality of information related to the display part, the strange feeling given to users can be reduced.

BRIEF DESCRIPTION OF THE DRAWINGS

FIG. 5A to FIG. 5D are diagrams showing the screen configuration used in the electronic device according to the embodiment of the present invention and the screen configuration of a comparative example for comparison.

DESCRIPTION OF NOTATIONS

1 . . . mobile phone, 11 . . . communication part, 12 . . . operation part, 13 . . . audio processing part, 14 . . . speaker (SP), 15 . . . mike (MIC), 16 . . . display part, 17 . . . memory part, 18 . . . control part, 19 . . . battery, 180 . . . main control part, 181 . . . information acquisition part, 182 . . . information display part, 183 . . . background image display control part, 184 . . . information display suppression part, 185 . . . internal clock, 186 . . . remaining battery power detection part, and 187 . . . reception strength judgment part.

BEST MODE FOR CARRYING OUT THE INVENTION

Figure 1:
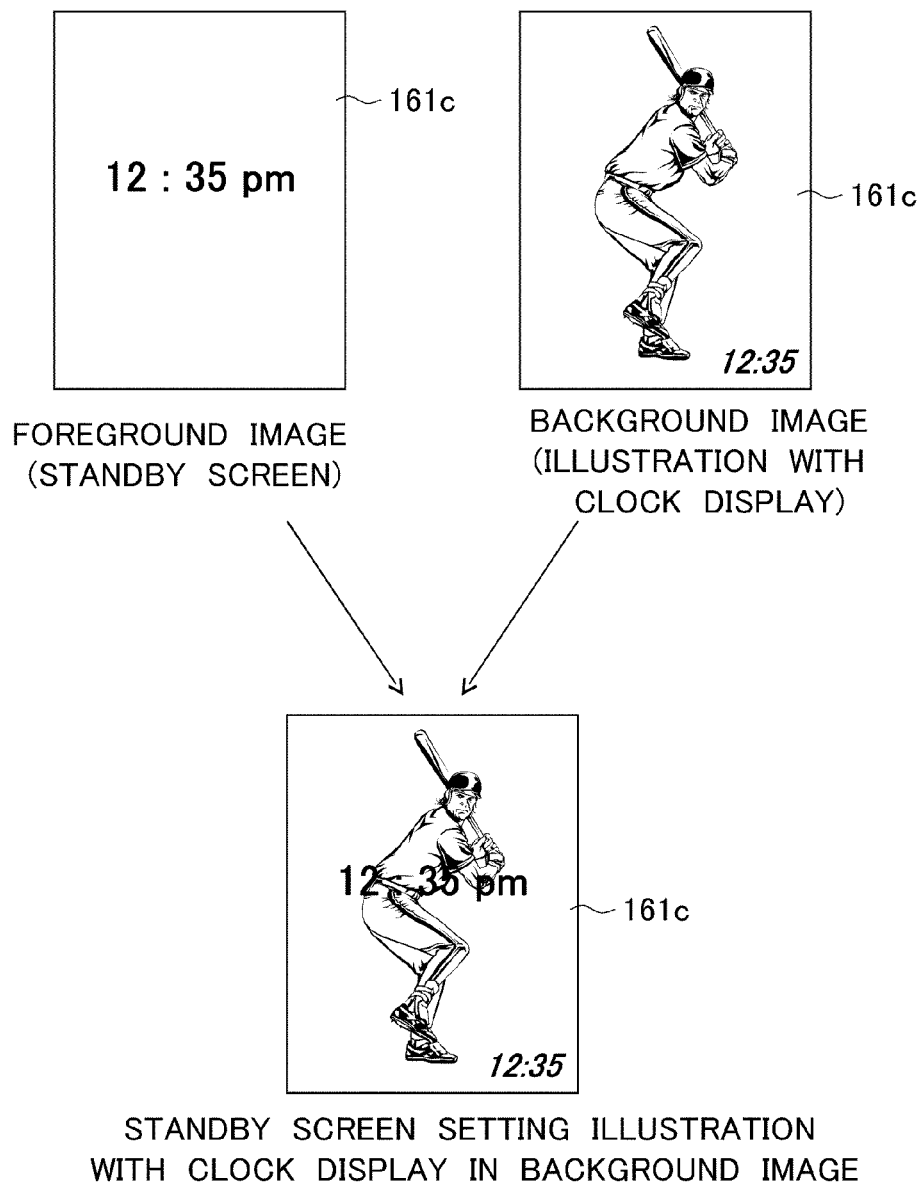
FIG. 1 is a diagram showing a screen configuration when a clock display of a foreground image and a clock display of a background image are superposed and displayed.
Figure 2:
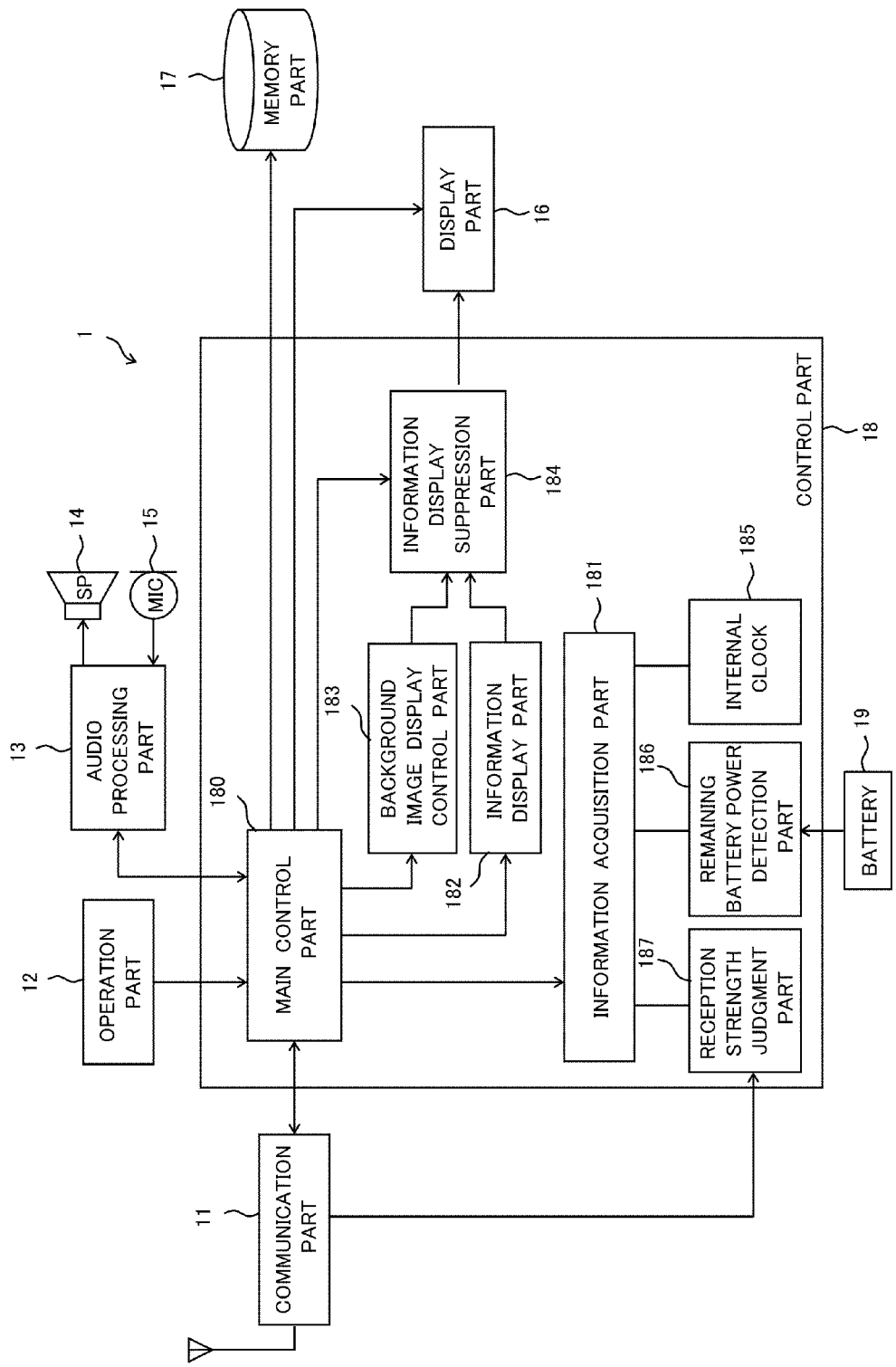
FIG. 2 is a block diagram showing the configuration of an internal portion of an electronic device according to an embodiment of the present invention.

FIG. 2 is a block diagram showing the configuration of an internal portion of an electronic device according to an embodiment of the present invention. Here, a mobile phone 1 is exemplified as the electronic device.

The mobile phone 1 is, as shown in FIG. 2, configured by a communication part 11, operation part 12, audio processing part 13, speaker (SP) 14, microphone (MIC) 15, display part 16, memory part 17, control part 18, and battery 19.

The communication part 11 acquires a plurality of communication systems and performs wireless communication with a network side apparatus including a base station connected to a mobile communication network 2 according to a communication protocol of, for example, CDMA2000 1x (hereinafter simply referred to as 1x) or EVDO.

Note that, EVDO communication is faster than 1x communication, and 1x communication has the feature of supporting audio communication as well other than data communication unlike EVDO communication.

The operation part 12 has, for example, a power key, a speak key, number keys, letter keys, direction keys, an execute key, a send key, and other keys to which various functions are assigned. When these keys are operated by the user, the operation part 12 generates signals corresponding to those operation contents and inputs these as an instruction of the user to the control part 18.

The audio processing part 13 performs the processing of the audio signal output from the speaker 14 and the audio signal input at the microphone 15.

Namely, the audio processing part 13 amplifies audio input from the microphone 15, performs analog-to-digital conversion, and further applies encoding or other signal processing to convert it to digital audio data and outputs the result to the control part 18.

Further, the audio processing part 13 applies decoding, digital-to-analog conversion, amplification, or other signal processing to the audio data supplied from the control part 18 to convert it to an analog audio signal and outputs the result to the speaker 14.

The display part 16 is configured by using, for example, a liquid crystal display panel, an organic EL (electro-luminescence) panel, or other display device and displays an image in accordance with a video signal supplied from the control part 18.

The display part 16 displays, for example, an image containing a flash content, standby image, and other various types of information and images obtained through the communication part 11.

The display part 16 displays pictographs such as the date, time, and remaining battery power other than a phone number of a destination at the time of a send operation, a phone number of the other party at the time of reception, received mail, and transmitted mail.

The memory part 17 stores various types of data utilized for processing in the control part 18.

The memory part 17 holds, for example, application programs executed by the control part 18, an address book for managing personal information such as phone numbers and e-mail addresses of the other parties of the communication, an audio file for playing back an incoming call sound and an alarm sound, an image file containing the flash content of the standby screen, various types of setting data, temporary data utilized in the processing process of the programs, and so on.

Note that, the above memory part 17 is configured by, for example, a nonvolatile memory device configured by a flash memory, SRAM, DRAM, or other random accessible memory device.

The control part 18 centrally controls the entire operation of the mobile phone 1.

Namely, the control part 18 controls operations of blocks explained above so that various types of processing of the mobile phone 1 are executed in a suitable sequence in accordance with the operation of the operation part 12.

The various types of processing of the mobile phone 1 include call carried out through a line exchange network, preparation and transmission/reception of e-mails, control of viewing of Internet Web (World Wide Web) sites, and so on. Further, the operations of blocks include transmission/reception of signals at the communication part 11, input/output of audio at the audio processing part 13, display of an image on the display part 16, and so on.

The control part 18 is provided with a computer (microprocessor) executing processing based on a program (operating system, application program, and so on) stored in the memory part 17. The control part 18 executes the processing explained above according to the sequence instructed in this program.

Namely, the control part 18 sequentially reads instruction codes from the operating system, application program (particularly standby application here), or other program stored in the memory part 17 to execute the processing.

The control part 18 obtains internal information related to the state of the internal portion of the mobile phone 1 (information held inside the mobile phone 1) such as the present time, received electric field strength, and remaining battery power and displays the obtained information on the display part 16.

The control part 18 has a function of displaying a background image as wallpaper in a principal display region of the display part 16 in a standby state and, when this background image contains the same information as the internal information which was previously obtained and displayed, suppressing display of either of the display of the internal information or the display of the same information by the background image.

The control part 18 has, as shown by the functions of its internal configuration in FIG. 2, a main control part 180, information acquisition part 181, information display part 182, background image display control part 183, information display suppression part 184, internal clock 185, remaining battery power detection part 186, and reception strength judgment part 187.

Note that, the functions of these blocks are achieved by execution of programs stored in the memory part 17 by the control part 18. These do not only indicate blocks substantially differentiated from the other blocks and built-in the control part 18. The processing parts are separately expressed just for simplification of the explanation.

The main control part 180 makes the information acquisition part 181 obtain the received electric field strength, remaining battery power, and other internal information concerning the state of the internal portion of the mobile phone 1, including the present time, as the display information and displays the obtained display information on the display part 16.

The main control part 180 displays a background image in the principal display region (valid screen) of the display part 16 and realizes the function of the control part 18 of suppressing display of either of the display of the internal information or the display of the related information due to the background image when the background image contains related information related to the internal information which was previously obtained and displayed.

For this reason, the main control part 180 oversees the sequence control of the function blocks of the information acquisition part 181, information display part 182, background image display control part 183, and information display suppression part 184 at the time of the wallpaper display processing at the time of the standby application explained below.

The information acquisition part 181 obtains the present time from the internal clock 185 and obtains the remaining power of the battery 19 from the remaining battery power detection part 186.

Further, the information acquisition part 181 periodically obtains information concerning the received electric field strength from the reception strength judgment part 187 and supplies it as the internal information of the mobile phone 1 to the main control part 180.

Note that, the internal clock 185 is a clock built-in the mobile phone 1 and holds time information by counting time etc. based on an input value of the user or time information transmitted from a base station.

The remaining battery power detection part 186 has a function of detecting for example a battery voltage to detect the remaining power of the battery 19.

The reception strength judgment part 187 has a function of detecting, for example, a reception sensitivity of signals transmitted from the base station from an error ratio etc.

The information display part 182 has a function of displaying the internal information obtained at the information acquisition part 181 as the display information on the display part 16, while the background image display control part 183 has a function of displaying a background image as the display image, for example, a flash content obtained from an external network server (not shown) through the communication part 11, in the principal display region (valid screen) of the display part 16.

The information display suppression part 184 has a function of suppressing display of either of the internal information by the information display part 182 or the related information by the background image display control part 183 when the background image displayed by the background image display control part 183 contains related information related to the internal information displayed in the information display part 182. Note that, the related information is information the same as the internal information, information of the same type as the internal information, and the like.

At this time, the control part 18 (main control part 180) enables display of the foreground image while superimposing it on the background image displayed by the background image display control part 183, while the information display suppression part 184 performs control to suppress the display of information when the information display part 182 displays the internal information in the foreground image.

The information display suppression part 184 finds the display position of the related information in the background image and the display position of the internal information in the foreground image and performs control to suppress the display based on the display positions in a case where the related information and the internal information would be displayed at the same position and be superimposed each other or a case where the related information and the internal information would be individually displayed at positions close to each other.

The information display suppression part 184 does not suppress display of the information in a case where the information would be displayed in a display region (second display region) different from the principal display region (first display region).

When one of the internal information displayed by the information display part 182 and the related information contained in the background image displayed by the background image display control part 183 contains information which does not exist in the other, the information display suppression part 184 suppresses display of the same information in the other between the internal information displayed by the information display part 182 and the related information contained in the background image displayed by the background image display control part 183.

For example, when flash content in which the time is displayed by the display setting of the background image (wallpaper) is selected at the time when "Year/Month/Day, Time" is displayed by the display setting (clock display setting) of the foreground image, "Year/Month/Day" of the information which is not the same is displayed in the foreground image.

For this reason, in this case, the information display suppression part 184 makes it possible to display a lot of information without a strange feeling by suppressing displaying of the "Time" of the same information in the background image display.

When set so that the predetermined information is displayed in either of the internal information by the information display part 182 or the background image by the background image display control part 183, the information display suppression part 184 suppresses a setting where the predetermined information is displayed when setting display of the other between the internal information by the information display part 182 or the background image by the background image display control part 183.

When, for example, configured so that the flash content set for display as the background image (wallpaper) displays the time, the information display suppression part 184 prevents selection of "Clock Display" by the display setting (time display setting) of the foreground image. In this case, calendar display is possible.

Alternatively, the above information display suppression part 184 prevents selection of flash content including time display by the display setting of the background image (wallpaper) when "Time Display" is set by the display setting (time display setting) of the background image.

Note that, the battery 19 is the source of drive power for supplying power to blocks configuring the mobile phone 1. Here, the battery 19 is shown as supplying electric power to only the control part 18, but actually supplies the required electric power to each of the communication part 11, operation part 12, audio processing part 13, speaker 14, microphone 15, display part 16, memory part 17, and control part 18.

Figure 3:
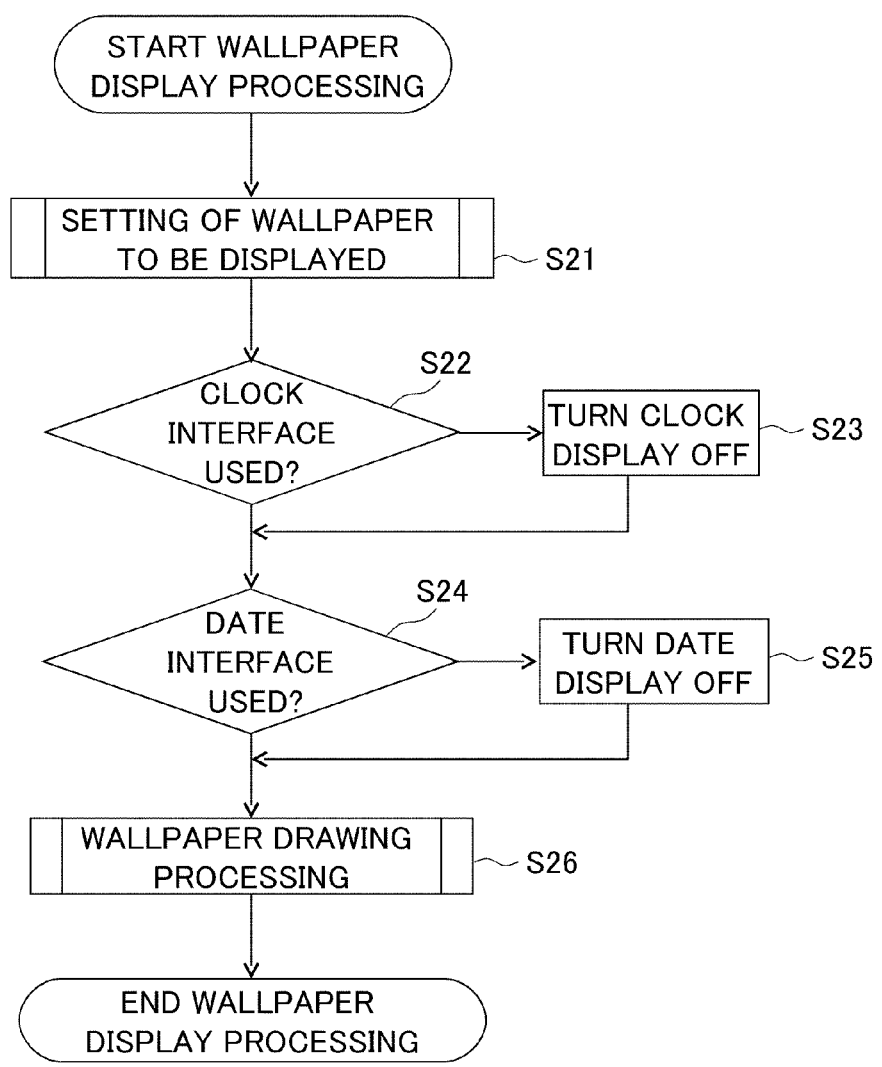
FIG. 3 is a flow chart showing an operation of the electronic device according to an embodiment of the present invention.

FIG. 3 is a flow chart showing the operation of a portable electronic device according to an embodiment of the present invention.

Figure 4A:
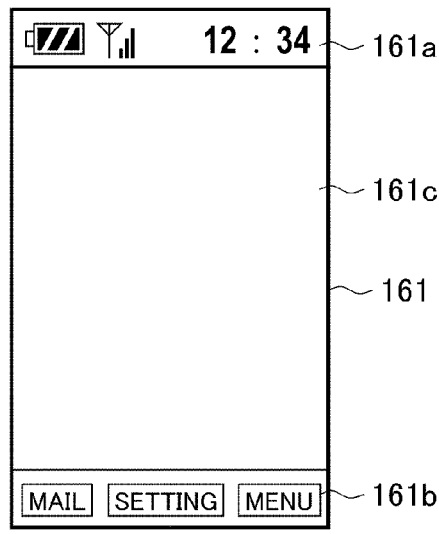
FIG. 4A and FIG. 4B are diagrams showing the configuration of a display screen in the electronic device according to the embodiment of the present invention.
Figure 4B:
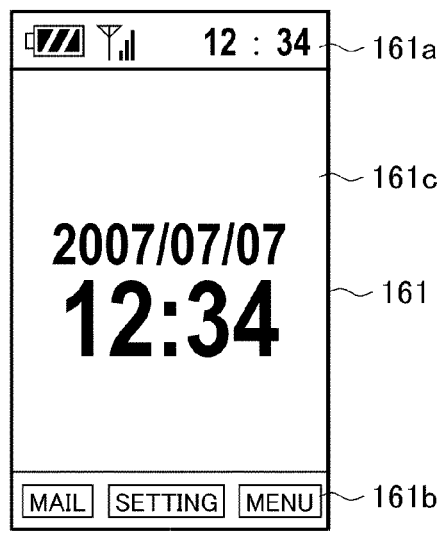

FIG. 4A and FIG. 4B are diagrams showing the configuration of a display screen in the electronic device according to the embodiment of the present invention.

Below, the operation of the electronic device shown in FIG. 2 will be explained in detail with reference to the flow chart shown in FIG. 3 and FIG. 4A and FIG. 4B.

The main control part 180 first performs processing for setting the wallpaper to be displayed on the display part 16 when starting the wallpaper display processing (step S21).

Specifically, the wallpaper is set by the user operating the operation part 12 to select from and set still images, flash content obtained by accessing the network through the communication part 11, and other data stored in the memory part 17.

Note that, it is assumed that the information display part 182 displays at the display part 16 either information of the present date, remaining battery power, electric field strength (antenna level), etc. which are individually obtained by the information acquisition part 181 from the internal clock 185, remaining battery power detection part 186, and reception strength judgment part 187 asynchronously with the wallpaper setting processing described above.

Specifically, the display screen (display) 161 of the display part 16 is configured by having, as shown in FIG. 4A and FIG. 4B, an information display region 161*a* capable of displaying various types of information on an upper end side, a guide display region 161*b* displaying the operation guide of the operation part 12 on a lower end side, and a principal display region 161*c* between the information display region 161*a* and the guide display region 161*b*.

Further, as shown in FIG. 4A, the information display part 182 displays, in the information display region 161*a* of the display screen 161, the information of the remaining battery power, electric field strength (antenna level), and the present date which are obtained by the information acquisition part 181.

Note that, the information display part 182 makes it possible to display not only the time, but also Year/Month/Day together in the setting of the clock display.

Further, as shown in FIG. 4B, the part is configured to be able to set an enlarged display of the date information not in the information display region 161*a*, but in the principal display region 161*c*.

On the other hand, the background image display control part 183 displays the image data (here, the flash content) of the wallpaper obtained as described above in the principal display region 161*c* of the display part 16.

At this time, the information display suppression part 184 analyzes the image data (flash content) set as the wallpaper in cooperation with the main control part 180 and judges whether or not a clock display interface is used for this image data (step S22).

Specifically, when an API (information request signal) is issued by display of the image data and this API (information request signal) name is "Get Local Time" as the result of analysis, the information display suppression part 184 judges this to be flash content equipped with the clock display function (step S22 "Yes").

Then, the information display suppression part 184, for example, sets the clock display OFF in the clock display settings of a menu function of the mobile phone 1 and suppresses (invalidates) the clock display by the information display part 182 described above (step S23).

At this time, the main control part 180 displays the various types of information to be displayed by the information display part 182 on the background image (image data of the wallpaper), which is displayed in the principal display region 161*c* by the background image display control part 183, superimposed on the principal display region 161*c* as foreground image.

When the information display part 182 displays information the same as the information (time information) displayed by the flash content in the principal display region 161*c* as the foreground image, the information display suppression part 184 controls the display of that information.

Note that, even in the case where the information display part 182 displays the clock information in the information display region 161*a* as shown in FIG. 4A, when the clock information is contained in the flash content of the image data of the wallpaper (background image) displayed in the principal display region 161*c* by the background image display control part 183, the information display suppression part 184 can suppress (invalidate) the display of the clock information in the information display region 161*a* by the information display part 182.

Further, here, the information display suppression part 184 suppressed the clock display by the information display part 182, but it is also possible to suppress the clock display of the flash content by the background image display control part 183.

Alternatively, an image not accompanied by a clock display may be automatically changed in setting as the wallpaper (background image). Alternatively, a configuration displaying a warning screen to the user to prompt a change of setting may be employed as well.

Here, a supplementary explanation will be given about the API. In the mobile phone 1, the standby application is started up in the standby state, then a standby screen (wallpaper) which is stored in the memory part 17 and set in advance is displayed on the display part 16.

When this wallpaper is flash content equipped with the function of displaying a clock or other information, it is necessary to obtain that information by the standby application. A signal of requesting the information to the other application. is transmitted.

This information request signal is the "API". The display information by the flash content is discriminated by discriminating that name (command). For example, when the API name is "Get Local Time", it is discriminated as flash content equipped with a clock display function.

Further, when a menu item of "Displayed/Not Displayed/Automatically Set" is set as the time display setting of the mobile phone 1, and "Automatically Set" is selected, the time information by the information display part 182 is "Not Displayed" at the time when the flash content equipped with the time display function is set as the wallpaper (background image). When wallpaper other than the flash content equipped with the time display function is set, the time information is "Displayed" by the information display part 182.

In this way, by selecting "Automatically Set" as the set value of the menu function in the display setting of the time information on the mobile phone 1 side, suppression of one clock display is possible.

The explanation will be returned to the flow chart of FIG. 3 next.

At step S22, when the set wallpaper (flash content) is analyzed and it is judged that the clock display interface is not used (step S22 "No"), the information display suppression part 184 further analyzes the set wallpaper (flash content) and judges whether or not the date display interface is used (step S24).

Specifically, when the result of the analysis is that the API name is "Get Date Day", it is judged as flash content equipped with a date display function (step S24 "Yes"). For example, the date display in the date display setting of the menu function is set to OFF, and the date display by the information display part 182 described above is suppressed (step S25).

Note that, here, the date display by the information display part 182 was suppressed. However, the date display of the flash content by the background image display control part 183 may be suppressed as well.

Note that, at step S24, when the set flash content is analyzed and it is judged that the date display interface is not used (step S24 "No"), the main control part 180 ends one series of wallpaper display processing described above by drawing the wallpaper-set flash content in a not shown display memory. As the display memory, for example, use is made of a VRAM etc. assigned to the fixed region of the memory part 17.

The wallpaper drawn in the memory part 17 passes through the main control part 180, is read out through the information display part 182 and background image display control part 183, and is displayed on the display part 16 through the information display suppression part 184.

FIG. 5A to FIG. 5D are diagrams showing one example of the display screen configuration.

FIG. 5A shows an image displayed in the principal display region 161c as the foreground image by the information display part 182. FIG. 5B shows an image displayed in the principal display region 161c as the background image by the background image display control part 183.

FIG. 5C shows an image according to the embodiment of the present invention in a case where the image shown in FIG. 5A and the image shown in FIG. 5B are displayed superimposed. FIG. 5D shows an image according to the existing description in the case where the image shown in FIG. 5A and the image shown in FIG. 5B are displayed superimposed as a comparative example in comparison with FIG. 5C.

By the electronic device according to the embodiment of the present invention, when the flash wallpaper displayed by the background image display control part 183 is <Clock Exists, Date Exists> as shown in a lower part of FIG. 5B, on the display part 16 of the mobile phone 1, display of the clock information and date information which are displayed in the principal display region 161c by the information display part 182 is suppressed. Then, as shown in the lower stage of FIG. 5C, the wallpaper is displayed as <No Clock Display, No Date Display>.

In the same way, when the flash wallpaper is <No Clock, Date Exists>, display of the date information by the information display part 182 is suppressed. This is displayed on the display part 16 as <Clock Display Exists, No Date Display>. In a case where the flash wallpaper is <Clock Exists, No Date> as shown in a middle stage of FIG. 5B, display of the clock information by the information display part 182 is suppressed. Then, this is displayed on the display part 16 as <No Clock Display, Date Display Exists>.

When the flash wallpaper is <No Clock, No Date> as shown in an upper stage of FIG. 5B, display of various types of information by the information display part 182 is not suppressed, but the information is displayed on the display part 16 as <Clock Display Exists, Date Display Exists>.

Note that, the above explanation was given with reference to the example of flash content equipped with a clock and date display function, but the same processing may also be applied for a case where flash content having a function of displaying the radio condition (received electric field strength) and remaining battery power is set as the wallpaper (background image). Presence/absence of the API name of "Get Sign Level" will be judged in the case of the radio condition, and presence/absence of API name of "Get Battery Level" will be judged in the case of the remaining battery power.

Specifically, when flash content equipped with a radio condition display function is set as the wallpaper (background image) to be displayed in the principal display region 161c by the background image display control part 183, the information display suppression part 184 suppresses (invalidates) the information display of the electric field strength (antenna level) in the information display region 181a by the information display part 182.

Further, when the flash content equipped with the remaining battery power display function is set, the information display suppression part 184 suppresses (invalidates) the information display of the remaining battery power in the information display region 181a by the information display part 182.

Note that, when configured so that, not limited to these clock (date) information, electric field strength (radio condition), and remaining battery power, the flash content and other image data which are set for display by the background image display control part 183 display information the same as the information (internal information) displayed by the information display part 182, display of information by the information display part 182 may be suppressed or display of information by the background image display control part 183 may be suppressed.

As explained above, according to the present embodiment, at the time of the wallpaper display processing, the information display suppression part 184 suppresses either of display of the internal information by the information display part 182 or display of the related information by the background image display control part 183 when the background image displayed in the principal display region 181c as the wallpaper at the time of waiting by the background image display control part 183 contains the related information (clock, date, radio condition, and remaining battery power) related to the internal information displayed by the information display part 182.

Due to this, in accordance with the wallpaper set by the user, display of status information of the portable electronic device including the date such as "Clock Display", "Date Display", "Radio State Display", and "Remaining Battery Power Display" can be optimized.

For this reason, the user does not need to perform a special operation. Accordingly, the load is reduced, and a wallpaper display with a good viewability is made possible without spoiling the design property of the wallpaper.

Further, the information display suppression part 184 may find the display position of the information in the background image and the display position of the information in the foreground image and suppress display of either information as well in a case where the two information would be displayed at the same position or positions close to each other as shown at the lower stage of FIG. 5D.

Further, the information display suppression part 184 need not suppress display of the information when the information display part 182 displays the information the same as the information displayed by the background image display control part 183 in a display region different from the principal display region 161*c*, for example, the information display region 161*a*.

Further, the information display suppression part 184 displays the "Year/Month/Day" of not the same information in the foreground image when, for example, flash content including a clock is selected as the background image (wallpaper) to be displayed by the background image display control part 183 at the time when "Year/Month/Day, Time" is displayed by the information display part 182 by the display setting (clock display setting) of the foreground image. For this reason, by suppressing the information display in the background image in this case, display of a lot of information without incompatibility can be made possible.

Further, when flash content for performing the time display is set in the background image (wallpaper), the information display suppression part 184 may prevent selection of "Clock Display" by the display setting (time display setting) of the foreground image. In this case, calendar display is possible.

Alternatively, when "Time Display" is set by the display setting (time display setting) of the foreground image, selection of image data (flash content) including time display by the setting of the background image (wallpaper) may be disabled.

Further, when the flash content intermittently performs the time display, the information display suppression part 184 may judge presence/absence (period) of the clock display and suppress the time display in the foreground image only in a case where the clock display is carried out.

Further, recently, a mobile phone 1 capable of being set to display a standby screen at random has appeared. In this case, for example, a JPEG, flash content without a clock display function, and flash content equipped with a clock display function are displayed at random.

In this case, the control part 18 (information display suppression part 184) judges whether or not there is flash content equipped with a time display function in the data displayed every time the display data is switched. If it exists, it can be handled by suppressing the clock display in the foreground image.

Further, when the flash content displays the electric field strength or remaining battery power etc., display of these pictographs in the fixed region (information display region 161*a*) may be suppressed as well. Further, in a case where the display format of the internal information which is displayed by the information display part 182 and the display format of the related information which is displayed by the background image display control part 183 are different, it is also possible to prevent suppression of display of the information. For example, even when the internal information and the related information are the same information, where one information is displayed by a numerical value, and the other information is displayed as an image, it is judged that the display formats are different, so the display is not suppressed.

Note that, only a mobile phone 1 was exemplified as a portable electronic device according to an embodiment of the present invention, but the same application is possible even in a case of mounting in a device having a similar configuration such as a PDA (personal digital assistant), electronic address book, game machine, or notebook personal computer.

Further, the functions provided in the control part 18 shown in FIG. 2 may all be realized by software or at least partially realized by hardware. For example, the data processing in the main control part 180 and the information display suppression part 184 may be realized on a computer by one or more programs or at least a portion thereof may be realized by hardware.

The invention claimed is:

1. An electronic device, comprising:
   a display part, and
   a control part controlling display content of the display part, wherein the control part includes
   a background image display control part displaying a background image on the display part,
   an information acquisition part acquiring display information,
   an information display part displaying the display information acquired at the information acquisition part on the display part, and
   an information display suppression part suppressing display of either of the display information displayed by the information display part or information contained in the background image when the display information is determined to be the same as the information contained in the background image.

2. An electronic device as set forth in claim 1, wherein the control part makes it possible to superimpose a foreground image on the background image, and
   the information display suppression part suppresses display of either of the display information or the information contained in the background image when the information display part displays the display information in the foreground image.

3. An electronic device as set forth in claim 2, wherein the information display suppression part finds a display position of the information contained in the background image and a display position of the display information in the foreground image and suppresses display of either of the display information or the information contained in the background image when the information contained in the background image and the display information are to be displayed at the same position or at positions close to each other based on these display positions.

4. An electronic device as set forth in claim 1, wherein the information display suppression part does not suppress display when the display information and the information contained in the background image are displayed at positions different from each other on the display part.

5. An electronic device as set forth in claim 4, wherein
the display image is displayed in a first display region of the display part, and
the information display suppression part does not suppress display when the background image is displayed in a second display region different from the first display region.

6. An electronic device as set forth in claim 1, wherein when one of the display information and background image contains other information which is not contained in the other of the display information and background image, the information display suppression part does not suppress display of the other information.

7. An electronic device as set forth in claim 1, wherein when one of the display information or the background image contains predetermined information, the information display suppression part suppresses setting of display of the predetermined information when setting display of the other of the display information and the background image.

8. An electronic device as set forth in claim 1, wherein the information display suppression part does not suppress display when the display format of the display information and the display format of the information contained in the background image are different.

9. A display method in an electronic device having a display part and a control part controlling display content of the display part, comprising:

acquiring display information and displaying the display information in a display region of the display part, displaying a background image in the display region of the display part, and suppressing display of either of the display information or information contained in the image when the display image contains information that is determined to be the same as the display information.

* * * * *